Dec. 25, 1973    J. W. MYERS    3,781,377
ISOMERIZATION OF NEOHEXENE
Filed Dec. 6, 1971
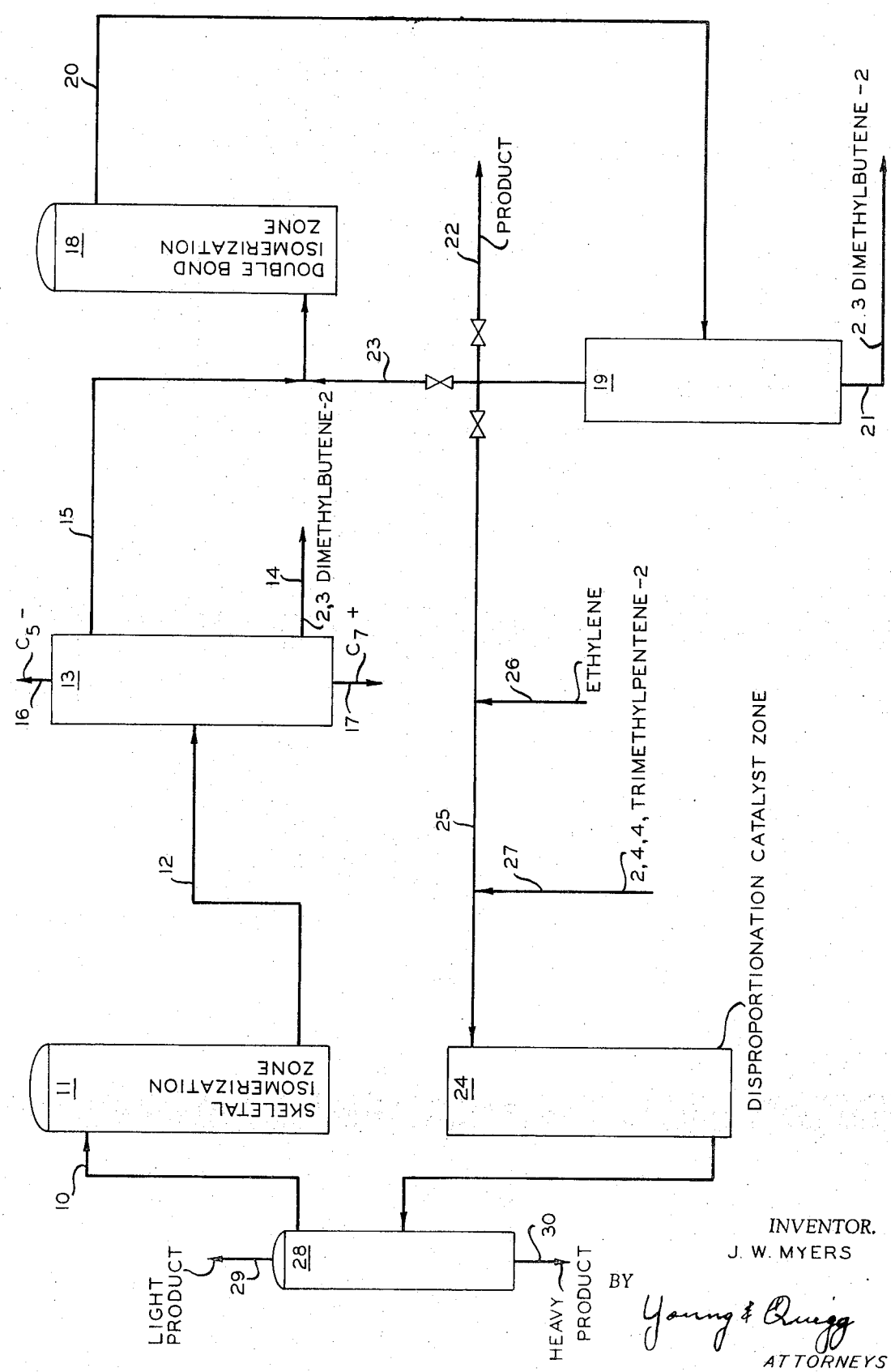
INVENTOR.
J. W. MYERS
BY
Young & Quigg
ATTORNEYS

United States Patent Office 3,781,377
Patented Dec. 25, 1973

3,781,377
ISOMERIZATION OF NEOHEXENE
John W. Myers, Bartlesville, Okla., assignor to
Phillips Petroleum Company
Continuation-in-part of abandoned application Ser. No. 859,815, Sept. 22, 1969. This application Dec. 6, 1971, Ser. No. 205,377
Int. Cl. C07c 5/24
U.S. Cl. 260—683.2          11 Claims

ABSTRACT OF THE DISCLOSURE

Neohexene is skeletally isomerized to 2,3-dimethylbutene-2 with excellent selectivity and conversion utilizing an alumina catalyst containing 0.1 to 0.2 weight percent sodium oxide and having a surface area of 150 to 180 square meters per gram. 2,3-dimethylbutene-1 produced in the reaction is double bond-isomerized to provide additional 2,3-dimethylbutene-2. Where the neohexene is produced by disproportionation of 2,4,4-trimethylpentene-2 and ethylene, a dimethylbutene-1 fraction containing methylpentenes from the second isomerization step can be advantageously fed to the disproportionation catalyst zone, thereby eliminating the problem of separating the methylpentenes.

---

This application is a continuation-in-part of U.S. application Ser. No. 859,815 filed Sept. 22, 1969, now abandoned.

BRIEF STATEMENT OF THE INVENTION

Heretofore, neohexene, i.e., 3,3-dimethylbutene-1, has been converted to 2,3-dimethylbutene-2 by contacting it with alumina having surface areas of the order of 75 to 85 square meters per gram and containing 0.4 to 0.5 weight percent sodium oxide. When operating under skeletal isomerization conditions, either the selectivity or conversion was low. Thus, employing conditions suitable for obtaining selectivities above 90 percent, conversions of 80 percent or less were realized. Conversely, when employing conditions suitable for obtaining conversions above 90 percent, the selectivity dropped well below 80 percent.

I have discovered that high conversions and selectivity can be simultaneously realized by utilizing an alumina of low sodium oxide content and high surface area. Specifically, where the alumina has a sodium oxide content of 0.1 to 0.2 and a surface area of 150 to 180 square meters per gram, the isomerization occurs with selectivity and conversion both above 90 percent over a wide range of operating conditions. Presently preferred is a gamma alumina.

In another aspect, I have provided a process for producing a high yield of 2,3-dimethylbutene-2 from neohexene by a novel combination of skeletal and double bond isomerization steps and related fractionation steps. This process is applicable broadly to the conversion of neohexene with any of the well known skeletal isomerization catalysts, and involves double bond isomerization of the by-product, 2,3-dimethylbutene-1, to the desired product.

Where the neohexene is produced by disproportionation of 2,4,4-trimethylpentene-2 and ethylene, the 2,3-dimethylbutene-1 concentrate from the effluent of the double bond isomerization step can be advantageously fed to the disproportionation zone. In this fashion, I avoid separation of the methylpentenes present in the 2,3-dimethylbutene-1 concentrate. These materials are quite difficult to separate by normal fractionation techniques.

The methylpentenes, when contacted with ethylene in the presence of an olefin disproportionation catalyst, are substantially converted to lighter olefins, such as isobutylene and propylene, which are easily separable. The dimethylbutenes are partly unconverted and partly converted to isobutylene. The isobutylene is valuable because it can be recovered easily and conventionally dimerized to 2,4,4-trimethylpentane and fed to the disproportionation reactor. Thus, the 2,3-dimethylbutene-1 concentrate is substantially converted to isobutylene which is re-usable in the process and ultimately recovered as 2,3-dimethylbutene-2 product. Moreover, there is no undesirable build-up of methylpentenes because the methylpentenes are substantially converted to isobutylene which is useful to produce the 2,4,4-trimethylpentene.

DETAILED DESCRIPTION OF THE INVENTION

The invention will be more clearly understood from the following detailed description taken in conjunction with the accompanying drawing, in which:

The figure is a flow diagram of my novel isomerization and separation process.

Referring now to the figure, neohexene feed is charged through a conduit 10 to a skeletal isomerization zone 11 where it is contacted with any of the well known skeletal isomerization catalysts at skeletal isomerization conditions. As previously noted, I have discovered that this isomerization takes place with an excellent combination of conversion and selectivity where the isomerization catalyst is alumina containing 0.1 to 0.2 weight percent sodium oxide, and having a surface area of 150 to 180 square meters per gram, and more preferably a gamma alumina with such characteristics.

The effluent from the zone 11 is passed through a conduit 12 to a fractionation zone 13 wherefrom a 2,3-dimethylbutene-2 product is recovered through a conduit 14 and a 2,3-dimethylbutene-1 concentrate is recovered through a line 15. Hydrocarbon products having 5 or less carbon atoms are taken overhead through a line 16 and heavier products produced in the skeletal isomerization reactor are recovered as a bottoms product through the conduit 17.

In accordance with the invention, the 2,3-dimethylbutene-1 concentrate, which contains small quantities of 2,3-dimethylbutene-2 and methylpentene, is fed to a double bond isomerization zone 18 utilizing any of the well known double bond isomerization catalysts at double bond isomerization conditions. In this zone, a substantial portion of the 2,3-dimethylbutene-1 is converted to 2,3-dimethylbutene-2. The latter component is recovered as a bottoms product from a fractionation zone 19 to which the effluent of the reactor 18 is fed by a line 20, the product being recovered through a conduit 21 and combined with that discharged through the conduit 14.

The overhead product from the fractionation zone 19 consists mainly of 2,3-dimethylbutene-1 together with small quantities of methylpentenes and 2,3-dimethylbutene-2. In one aspect of the invention, part of this material, say 50 percent, is recovered through a valved conduit 22 and the remainder is passed through a valved line 23 to the inlet conduit of the zone 18. Where the quantity of methylpentenes produced is small, the process can advantageously be conduited as described for long periods of time without consequential build-up of methylpentenes in the system.

More advantageously, however, the neohexene feed charged to the conduit 10 is produced in a disproportionation catalyst zone 24, and the 2,3-dimethylbutene-1 stream taken overhead in the fractionation zone 19 is charge to the disproportionation zone through a valved conduit 25. Ethylene is charged to the disproportionation zone 24 through a line 26 and 2,4,4-trimethylpentene-2 is charged to the zone 24 through a conduit 27. In this fashion, a disproportionation reaction occurs between the ethylene and 2,4,4-trimethylpentene-2 to produce neohexene and isobutylene. The neohexene is recovered in a fractionation zone 28 and charged to the zone 11 through the conduit 10. Light products of the disproportionation reaction, principally isobutylene, are recovered from the zone 28 through a conduit 29 and heavy products are recovered through a conduit 30. The isobutylene is conveniently dimerized (not shown) to form additional 2,4,4-trimethylpentene-2 for the ethylene disproportionation step.

According to the invention, a large portion of the methylpentenes present in the conduit 25 are converted to propylene and isobutylene in the zone 24. These products are readily separated from the neohexene in the fractionation zone 28. A portion of the 2,3-dimethylbutene-1 is also disproportionated to isobutylene. This isobutylene is added to that returned for dimerization.

It will be apparent that I have achieved the objects of the invention providing a highly efficient system for converting neohexene to 2,3-dimethylbutene-2, involving the skeletal isomerization of the neohexene feed and double bond isomerization of 2,3-dimethylbuteene-1 produced in the skeletal isomerization step. The separation steps cooperate with the isomerization steps to provide efficient recovery of the desired product. Where the neohexene feed is provided by the disproportionation of ethylene with 2,4,4-trimethylpentene-2, the 2,3-dimethylbutene-1 stream recovery from the effluent of the double bond isomerization step is largely converted to propylene and isobutylene which are readily separable from the neohexene in the fractionation zone 28. Finally, I have provided a novel skeletal isomerization process whereby neohexene is converted to 2,3-dimethybutene-2 with excellent yields and selectivity.

SPECIFIC EXAMPLES AND CONDITIONS

A broad aspect of the invention relates to the combination of the described double bond isomerization, skeletal isomerization, disproportionation and fractionation steps utilizing well known disproportionation and isomerization catalysts for which the operating conditions, catalyst preparation, regeneration and activation are well known to those skilled in the art and, hence, need not be described in detail herein. The following Table I sets forth exemplary catalysts and conditions.

In the broader aspects of the invention involving both double bond and skeletal isomerization catalysts, other skeletal isomerization catalysts can be utilized in the zone 11. Illustrative catalysts of this type are silica-alumina, eta-alumina, tungsten oxide or eta-alumina, molybdena-boria-alumina, aluminum fluoride, aluminum fluoride promoted with oxides of tungsten, platinum, or chromium, hydrogen fluoride-treated alumina, and the like.

The catalyst in the double bond isomerization zone may be the same as that employed in the zone 11 but operated under milder conditions, as indicated by the preceding table. Other suitable double bond isomerization catalysts are 0.05 weight percent of palladium supported on alumina, bauxite, magnesium oxide, zinc oxide, phosphoric acid on kieselguhr, and the like.

Catalysts suitable for use in the disproportionation step are any of those catalyst systems which have activity for the conversion of an olefin into other similar olefins of both higher and lower molecular weight, such as the conversion of propylene into approximately equimolar quantities of ethylene and butenes. Specific examples are tungsten oxide on silica, molybdenum oxide on alumina, molybdenum oxide on aluminum phosphate, rhenium oxide on aluminum, and molybdenum hexacarbonyl on alumina. A particularly preferred disproportionation catalyst system is one part of $WO_3$ on $SiO_2$ catalyst in admixture with about 6 parts of MgO by weight.

It will be understood that the catalysts listed above and the operating conditions are purely illustrative and form no part of the present invention, insofar as the combination process of skeletal and double bond isomerization is concerned. In this process, the invention resides in the novel combination of isomerization, fractionation and disproportionation steps.

In a specific example, 95 pounds per hour of neohexene concentrate is charged to the isomerization zone 11 which is operated at a temperature of 600° F., a pressure of 1 atmosphere, and a liquid hourly spaced velocity of 2.

In the fractionation zone 13, 0.5 pound per hour of heavy product recovered through the conduit 16 and 0.5 pound per hour of heavy product through the conduit 17. About 5 lb./hr. of unchanged neohexene is recovered and recycled (not shown) to skeletal isomerization zone 11. 56 pounds per hour of 2,3-dimethylbutene-2 containing a trace of methylpentene is recovered through the line 14. The 2,3-dimethylbutene-1 concentrate recovered through the conduit 15 contains 29 pounds per hour of

TABLE I

| | Skeletal isomerization | Double bond isomerization | Disproportionation |
|---|---|---|---|
| | Zone 11 | Zone 18 | Zone 24 |
| Catalyst | Alumina | Palladium (0.05%) on alumina. | Tungsten oxide (8%) on silica. |
| Temperature | 500–800° F | 120–350° F | 400–1,100° F. |
| Moles H²/mole olefin feed | | 0.03–0.1 | |
| Moles ethylene/mole olefin feed | | | 2–20. |
| Liquid hourly space velocity | 0.5–30 | 0.5–30 | 0.5–100. |
| Pressure, p.s.i.g | 0–200 | 15–250 | 0–2,000. |
| Catalyst activation: | | | |
| Temperature, °F | 800–1,400 | 150–400 | 900–1,200. |
| Time | 0.5–75 hours under nitrogen. | 0.1–30 min. in hydrogen. | 0.25–5 hr. in air. |

As stated, excellent selectivity and yields are obtained where the catalyst in the zone 11 is alumina having a surface area of 150 to 180 square meters per gram and a sodium oxide content of 0.1 to 0.2 weight percent. This is another aspect of the invention. Preferably, this is a gamma alumina catalyst. Additionally, this catalyst contains about 98.0 percent aluminum oxide. It has a bulk density of 0.77 to 0.81 kilogram per liter, a pellet density of 1.26 to 1.33, a true density of 3.6 to 3.7 kilograms per liter, a porosity of 60 to 65 volume percent and a crushing strength of 15 to 30 pounds.

The surface area is conventionally determined by the so-called "BET" method described in Journal of American Chemical Society 60 309 (1938).

2,3-dimethylbutene-1, 6 pounds per hour of 2,3-dimethylbutene-2 and 3 pounds per hour of methylpentenes.

The isomerization zone is 18 is operated at a temperature of 400° F., a pressure of 1 atmosphere and a liquid hourly space velocity of 2. An alumina catalyst is utilized in both isomerization zones which has a surface area of 150 to 180 square meters per gram and a sodium oxide content of 0.1 to 0.2 weight percent.

From the separation zone 19, 29 pounds per hour of 2,3-dimethylbutene-2 containing a trace of methylpentenes is recovered through the conduit 21, and the product recovered overhead contains 3 pounds per hour 2,3-dimethylbutene-2, 12 pounds per hour 2,3-dimethylbutene-1 and 3 pounds per hour methylpentenes. Half this material is recovered through the line 22, and the rest is passed through the conduit 23 to the zone 18. Where the disproportionation catalyst zone 24 is utilized, the stream leaving the fractionation zone 19 passes through conduits 22 and 25 to the disproportionation catalyst zone 24, 2,4,4-trimethylpentene-2 is fed to the zone 24 at the rate of 133 pounds per hour and ethylene is fed thereto at the rate of 56 pounds per hour. The zone 24 contains an olefin disproportionation catalyst system comprising 1 part $WO_3/SiO_2$ and 6 parts mg. O by weight and is operated at a temperature of 700° F., a pressure of 400 p.s.i.g. and a liquid hourly space velocity of 25 based on the $WO_3/SiO_2$ catalyst.

From the fractionation zone 28, 95 pounds per hour of neohexene concentrate is recovered and charged to the isomerization zone 11 while 96.3 pounds per hour of light product are discharged through the conduit 29 and 0.5 pound per hour of heavy product through the conduit 30. An isobutylene stream containing 83 pounds per hour is separated from the light product.

The following specific examples in Table II illustrate the conversion of neohexene to 2,3-dimethylbutene-2 utilizing the described high surface area gamma alumina catalyst containing 0.1 to 0.2 weight percent sodium oxide.

TABLE II

| Run | 1 | 2 | 3 | 4 |
|---|---|---|---|---|
| Temperature, °F | 604 | 606 | 603 | 601 |
| Pressure, p.s.i.g | 0 | 0 | 25 | 25 |
| Liquid hourly space velocity | 2.2 | 2.2 | 4.5 | 6.0 |
| Time in process period, hours | 1 | 24 | 29 | 25 |
| Conversion, wt. percent | 95.3 | 96.0 | 95.9 | 92.6 |
| Selectivity to 2,3-dimethylbutene, wt. percent | 96.7 | 95.6 | 95.6 | 96.9 |
| Product composition, wt. percent: | | | | |
| $C_5$ | 0.1 | 0.03 | 0.02 | 0.1 |
| 3,3-dimethylbutene-1 | 4.7 | 4.00 | 4.13 | 7.4 |
| 2,3-dimethylbutene-1 | 29.2 | 29.70 | 30.40 | 29.2 |
| 2,3-dimethylbutene-2 | 63.0 | 62.10 | 61.30 | 60.5 |
| Neohexane | | 0.03 | 0.03 | |
| 3- and 4-methylpentene-1 | | 0.09 | 0.08 | |
| 4-methyl-trans-pentene-2 | | 0.49 | 0.44 | |
| 2-methylpentene-1 | | 0.99 | 1.00 | |
| 2-ethylbutene-1 | 3.0 | 0.01 | 0.01 | 2.8 |
| 2-methylpentene-2 | | 2.40 | 2.43 | |
| 3-methyl-cis-pentene-2 | | 0.03 | 0.03 | |
| 3-methyl-trans-pentene-2 | | 0.08 | 0.07 | |
| $C_8$ | | 0.01 | 0.01 | |
| $C_{10}-C_{12}$ | | 0.04 | 0.05 | |
| Total | 100.00 | 100.00 | 100.00 | -00.00 |

To further illustrate that the defined gamma-alumina of 0.1 to 0.2 weight percent $Na_2O$ content, preferably of a surface area of 150 to 180 square meters per gram, represents a uniquely effective and superior catalyst, the following data in Table III is submitted with Run 5 a comparative run with another gamma-alumina:

TABLE III
Isomerization of neohexane to 2,3-dimethylbutenes

| Run | 5 | 6 | 7 |
|---|---|---|---|
| Catalyst | Alumina | Alumina | Alumina. |
| Type | Gamma | 1.0 fluoride treated. | Gamma and chi. |
| $Na_2O$, wt. percent | 0.01 | 0.01 | 0.38. |
| Surface, m.$^2$ g | 275 | 275 [b] | 75-85.[c] |
| Conditions: | | | |
| Temperature, °F | 605 | 608 | 662. |
| Pressure, p.s.i.g | 0 | 0 | 0. |
| Rate, LHSV | 1.6 | 1.9 | 0.5. |
| Results: | | | |
| Conversion, percent | 98 | 97 | 46.6. |
| Selectivity, percent | 70 | 51 | 100. |

[a] Data from Pine's and Haag, 82 J. Am. Chem. Soc., May 20, 1960, 2,471-2,483, at p. 2,474, experiment 35.
[b] Slightly less than this due to the fluoriding treatment.
[c] From supplier literature.

Comparison of Runs 1–4 from Table II using the defined gamma-alumina of 0.1 to 0.2 weight percent sodium oxide content and of a surface area of 150 to 180 square meters per gram with Runs 5–7 above using similar conditions but other catalysts, and particularly Runs 5 and 7 using other gamma-alumina catalysts of lesser or greater $Na_2O$ content and greater or lesser surface area than those as per my invention, clearly reflect the unique and valuable properties of my particularly defined catalysts in the skeletal isomerization process step I have disclosed in providing both high conversion and high selectivity together.

Other catalysts, even of similar $Na_2O$ content to my defined catalysts, but which are such as eta-alumina, are nowhere near as effective as my catalysts and do not provide the desired combination of both high conversion and high selectivity. Note particularly in the afore-referenced Pines and Haag article experiments 1, 11, and 19 through 23, using various eta-alumina catalysts of varying $Na_2O$ content and surface areas in runs using the same feed and very closely similar conditions to those I have employed. In all such instances, either conversion or selectivity was quite low. My carefully defined catalysts provide both high conversion and high selectivity.

I claim:

1. A process for making 2,3-dimethylbutene-2 which comprises contacting neohexene feed with a skeletal isomerization catalyst at skeletal isomerization conditions, fractionating the resulting effluent to provide a 2,3-dimethylbutene-1 concentrate containing methylpentenes, and a 2,3-dimethylbutene-2 product, contacting said concentrate with a double bond isomerization catalyst under double bond isomerization conditions, and recovering 2,3-dimethylbutene-2 from the effluent of the double bond isomerization step; wherein said skeletal isomerization catalyst consists essentially of gamma alumina containing 0.1 to 0.2 weight percent sodium oxide and having a high surface area of about 150 to 180 square meters per gram.

2. In the process of claim 1 recovering a stream containing 2,3-dimethylbutene-1 from the effluent of the double bond isomerization step, and charging said stream to the double bond isomerization zone.

3. A skeletal isomerization process comprising contacting neohexene with a catalyst consisting essentially of gamma alumina having a surface area of 150 to 180 square meters per gram, and a sodium oxide content of 0.1 to 0.2 weight percent, under skeletal isomerization conditions, hereby isomerizing the neohexene to 2,3-dimethylbutene-1.

4. The process of claim 3, wherein the catalyst is activated under nitrogen at a temperature of 800 to 1400° F. and a time of 50 to 75 hours.

5. The method of claim 4 wherein the skeletal isomerization process is operated at a temperature within the range of 500 to 800° F., a pressure of atmospheric to 200 pounds per square inch gauge and a liquid hourly space velocity of 0.5 to 30.

6. A process for making 2,3-dimethylbutene-2 which comprises:
(a) contacting neohexene feed with a skeletal isomerization catalyst under skeletal isomerization conditions,
(b) fractionating the resulting effluent from said contacting step (a) to provide a 2,3-dimethylbutene-1 concentrate further containing methylpentenes, and a first 2,3-dimethylbutene-2 product stream,
(c) contacting said concentrate from said step (b) with a double bond isomerization catalyst under double bond isomerization conditions,
(d) recovering from the effluent from said step (c) a second 2,3-dimethylbutene-2 product stream, and a fraction containing 2,3-dimethylbutene-1 further containing methylpentenes,
(e) disproportionating said fraction containing 2,3-dimethylbutene-1 and methylpentenes together with ethylene and 2,4,4-trimethylbutene-2 under disproportionation conditions,
(f) recovering from the effluent of said step (e) an isobutylene stream and a neohexene feed, and
(g) employing said neohexene feed in said step (a).

7. In the process of claim 6 further: recovering a stream containing 2,3-dimethylbutene-1 from the effluent of said double bond isomerization step (c) and charging said 2,3-dimethylbutene-1-containing stream to said double bond isomerization step (c).

8. The process of claim 7 further:
dimerizing under dimerization conditions at least a portion of said isobutylene to said 2,4,4-trimethylpentene-2.

9. The process of claim 8 wherein said skeletal isomerization catalyst in said step (a) consists essentially of gamma alumina having a sodium oxide content of 0.1 to 0.2 weight percent.

10. The process according to claim 9 wherein said skeletal isomerization gamma alumina catalyst is further characterized as having a surface area of 150 to 180 square meters per gram.

11. The process of claim 9 wherein the skeletal isomerization gamma alumina catalyst has a surface area of 150 to 180 square meters per gram; and the skeletal isomerization conditions are a temperature of 500 to 800° F., a liquid hourly space velocity of 0.5 to 30, a pressure of 0 to 200 pounds per square inch gage, a catalyst activation temperature of 800 to 1400° F. and a catalyst activation time of 0.5 to 75 hours under nitrogen, the double bond isomerization catalyst is palladium on alumina, and the double bond isomerization conditions are a temperature of 120 to 450° F., a liquid hourly space velocity of 0.5 to 30, a pressure of 15 to 250 pounds per square inch gage, the catalyst activation temperature is 150 to 400° F., the catalyst is activated for 0.1 to 30 minutes in hydrogen, and 0.03 to 0.1 mole of hydrogen is fed to the double bond isomerization zone per mole of olefin feed.

References Cited
UNITED STATES PATENTS

| | | | |
|---|---|---|---|
| 3,531,542 | 9/1970 | Myers et al. | 260—683.2 |
| 3,467,727 | 9/1969 | Kahn | 260—683.2 |
| 3,538,182 | 11/1970 | Kahn | 260—683.2 |
| 3,485,891 | 12/1969 | Heckelsburg | 260—683 |
| 3,261,879 | 7/1966 | Banks | 260—683 |
| 2,386,468 | 10/1945 | Ipatieff | 260—683 |
| 2,994,727 | 8/1961 | Appell | 260—683.2 |
| 2,952,719 | 9/1960 | Appell | 260—683.2 |

DELBERT E. GANTZ, Primary Examiner

V. O'KEEFE, Assistant Examiner

U.S. Cl. X.R.

260—683 D

UNITED STATES PATENT OFFICE

CERTIFICATE OF CORRECTION

Patent No. 3,781,377        John W. Myers        Dated: December 25, 1973

It is certified that error appears in the above-identified patent and that said Letters Patent are hereby corrected as shown below:

Claim 11, Column 7, line 1, "9" should be 6.

Signed and sealed this 18th day of June 1974.

(SEAL)
Attest:

EDWARD M. FLETCHER, JR.
Attesting Officer

C. MARSHALL DANN
Commissioner of Patents